United States Patent [19]

Nondahl

[11] Patent Number: 4,490,780
[45] Date of Patent: Dec. 25, 1984

[54] DIGITAL POWER CONVERTER

[75] Inventor: Thomas A. Nondahl, West Allis, Wis.

[73] Assignee: Allen-Bradley Company, Milwaukee, Wis.

[21] Appl. No.: 463,072

[22] Filed: Feb. 2, 1983

[51] Int. Cl.³ .......................................... H02M 7/155
[52] U.S. Cl. ...................................... 363/87; 363/129
[58] Field of Search .................. 363/87, 129, 54, 85, 363/88, 128; 323/241, 244, 246, 322, 319, 235

[56] References Cited

U.S. PATENT DOCUMENTS

| | | | |
|---|---|---|---|
| 3,611,097 | 10/1971 | Joslyn | 363/129 |
| 3,735,241 | 5/1973 | O'Sullivan | 323/241 |
| 3,914,681 | 10/1975 | Knott et al. | 363/87 X |
| 4,028,609 | 6/1977 | Detering | 363/129 |
| 4,347,562 | 8/1982 | Galloway | 363/87 |
| 4,348,718 | 9/1982 | Vollrath | 363/87 |
| 4,438,487 | 3/1984 | Kawai | 363/129 |

OTHER PUBLICATIONS

S. C. Gupta, et al., "A Generalized Firing Angle Controller Using Phase-Locked Loop for Thyristor Control", Feb., 1981, IEEE Transactions on Industrial Electronics and Control Instrumentation, vol. IECI-28, No. 1.
G. Olivier, et al., "Microprocessor Controller for a Thyristor Converter with an Improved Power Factor", Concordia University, Montreal, Canada.
S. Ashoka Krishna Bhat, "Novel Equidistant Digital Pulse Firing Schemes for Three-Phase Thyristor Converters", Int. J. Electronics, 1981, vol. 50, No. 3, 175-182.
Guy Olivier, et al., "Digitally Controlled Thyristor Current Source", Aug., 1979 IEE Transactions on Industrial Electronics and Control Instrumentation, vol., IECI-26, No. 3.
G. Olivier, et al., "Thyristor Current Source with an Improved Power Factor", Concordia University, Montreal, Quebec, Canada.
Dr. S. K. Tso, et al., "Dedicated-Microprocessor Scheme for Thyristor Phase Control of Multiphase Converters".

Primary Examiner—Peter S. Wong
Attorney, Agent, or Firm—Barry E. Sammons

[57] ABSTRACT

A microprocessor-based static converter control circuit includes a free-running counter which is synchronized with the powerline phase and frequency using a zero-crossing detector circuit. Firing angle commands are received and converted to a corresponding firing count. The microprocessor outputs a firing code for the thyristor firing pulse circuit when the count of the free running counter reaches the firing count.

5 Claims, 8 Drawing Figures

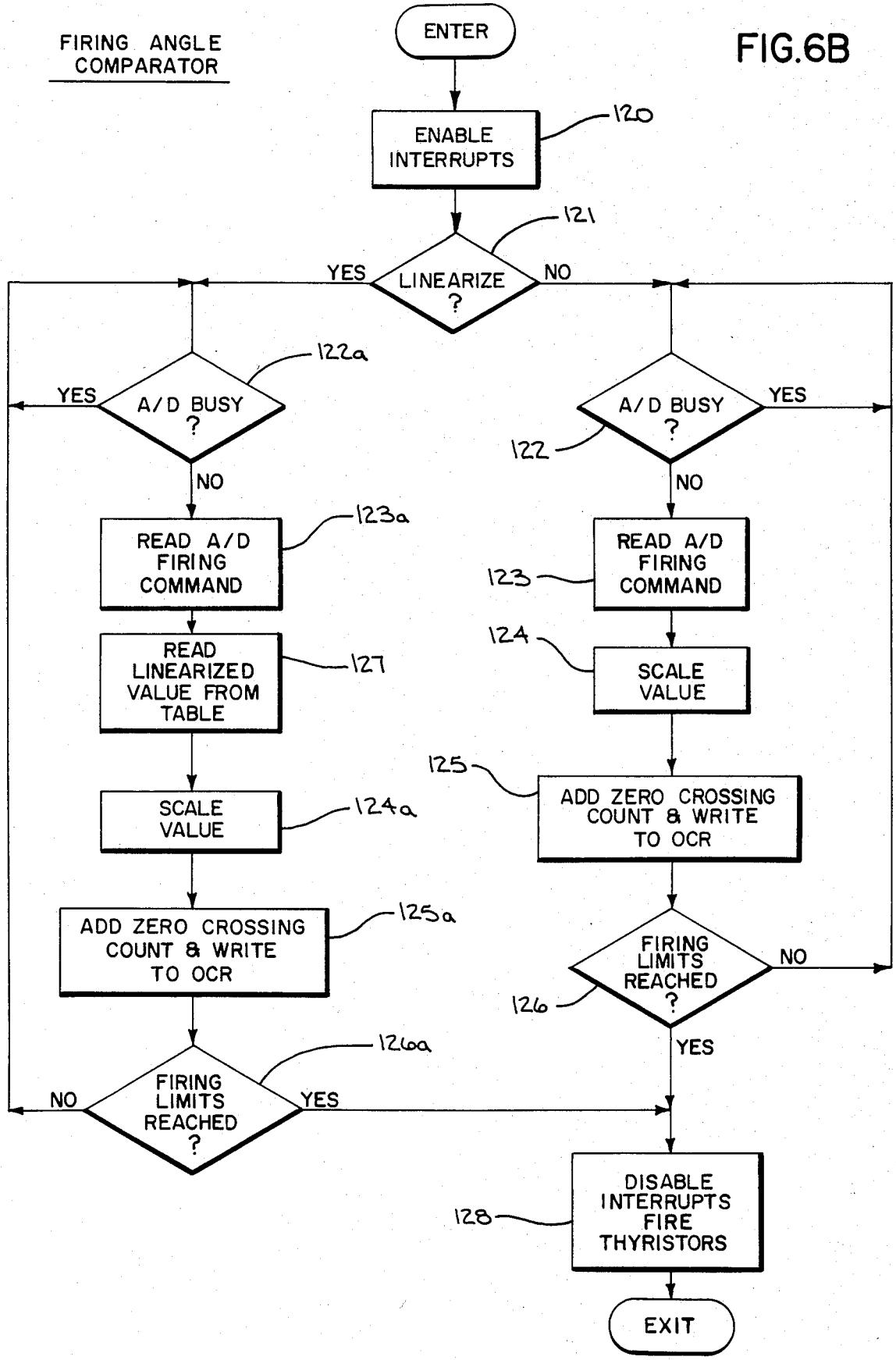

THYRISTOR SERVICE ROUTINE

DIGITAL POWER CONVERTER

BACKGROUND OF THE INVENTION

The field of the invention is static power converters for transforming a.c. power to a controlled d.c. voltage or d.c. current.

Static power converters have numerous applications in industry. They are used to provide controlled power to d.c. motors, and in recent years they are also being employed as a current source or a voltage source supply to adjustable speed a.c. motor drives. Such power supplies are also employed in induction heating equipment, corona treatment apparatus and electrostatic precipitators.

Static power converters have employed analog circuit techniques for many years. Such systems employ operational amplifiers and oscillators which are interconnected to produce firing pulses for the thyristors in the power supply bridge. In a three-phase fully controlled bridge, for example, firing pulses for six thyristors must be produced. The circuitry is complex and is subject to temperature drift and aging.

More recently, digital circuits have been developed to control the firing of the thyristors. In some instances such circuits merely add D/A and A/D converters to basically analog schemes, whereas other digital systems primarily employ discrete digital components. Regardless of the emphasis, these digital schemes require a relatively large number of parts which occupy considerable circuit board space. In addition, each digital converter control circuit must be designed and built for a limited number of end uses. For example, a control circuit for a constant current supply may be substantially different than that for a constant voltage source, and neither circuit may be applicable to an unregulated power supply or to a power supply which is to be controlled by signals indicative of other operating parameters, such as motor speed, armature current, motor flux, etc. As a result, a manufacturer of a wide range of products may require a corresponding large number of different converter control circuits to meet its needs.

One solution to many of these problems is to execute the functions performed by the discrete digital or analog devices with a programmed microprocessor. Examples of such microprocessor-based converter control circuits are disclosed in U.S. Pat. No. 4,347,562 and articles entitled "Microprocessor Controller for a Thyristor Converter With an Improved Power Factor" and "Dedicated-Microprocessor Scheme for Thyristor Phase Control of Multiphase Converters", published in *Proceeding of the 1980-IECI Conference,* Mar. 1980, and *IEE Proceedings,* (U.K.) Part B, Vol. 128 No. 2, pp 101-108, 1981. Although such prior microprocessor-based control circuits do reduce the number of components, they still require a substantial number of support components to maintain an adequate response time to changes in converter operating conditions. Even then, the response time of prior microprocessor-based control circuits is not sufficient for some motor control applications.

SUMMARY OF THE INVENTION

The present invention relates to a microprocessor-based static converter control circuit which requires a minimal number of discrete components. The control circuit includes a microprocessor having an internal free running counter which is periodically synchronized with the a.c. input voltage by a zero crossing detector; means for storing a sequence of codes which indicate the thyristors to be fired in each step of a firing sequence; means for receiving a firing angle command and calculating a corresponding firing count; a comparator for enabling a thyristor firing code to be applied to a thyristor firing circuit when the free running counter reaches the firing count.

A general object of the invention is to provide a general purpose static converter control circuit which contains a minimal number of discrete components. Nearly all of the elements are contained within the microprocessor and are under software control. Both the comparator and the free running counter are contained in the microprocessor, but they perform their functions independently, thus releasing the microprocessor to perform other programmed functions.

Another object of the invention is to synchronize the free running counter with the line frequency. The microprocessor contains an input capture register which receives a signal from the zero crossing detector in synchronism with the line frequency. The input capture register reads the value of the free running counter when this input signal is received, and this value serves as a reference count which is employed to synchronize the free running counter with the line voltage.

Yet another object of the invention is to provide a static converter which automatically adapts to wide variations in line frequency. The number of "counts" between signals from the zero crossing detector is an indication of line frequency and the variables employed by the static converter can be scaled automatically in response to changes in this count.

A more specific object of the invention is to filter out noise signals on the power lines which distort the zero crossings. This is accomplished by rejecting counts which indicate drastic changes in line frequency and by averaging, or accumulating, acceptable zero crossing readings.

Another object of the invention is to provide a microprocessor-based static converter control circuit which responds quickly to changes in the firing angle command. By employing the free running counter, output compare register, and input capture register built into the microprocessor circuit, the microprocessor is not significantly burdened by "real time events" and is free to perform programmed functions more quickly without the addition of discrete hardware components.

Yet another object of the invention is to provide a static converter control which may be employed in a wide variety of applications. The circuit responds to the firing angle command by firing the thyristors in the proper sequence and at a specific phase angle. Depending on the particular application, the converter control may be "programmed" such that changes in the firing angle command may produce either a linear or a nonlinear change in the phase angle at which the thyristors are fired. The desired relationship is stored in a look-up table which can be easily adapted to specific applications.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIGS. 6A-6C are flow charts of the programs executed by the processor of FIG. 5.

DESCRIPTION OF THE PREFERRED EMBODIMENT

Figure 1:
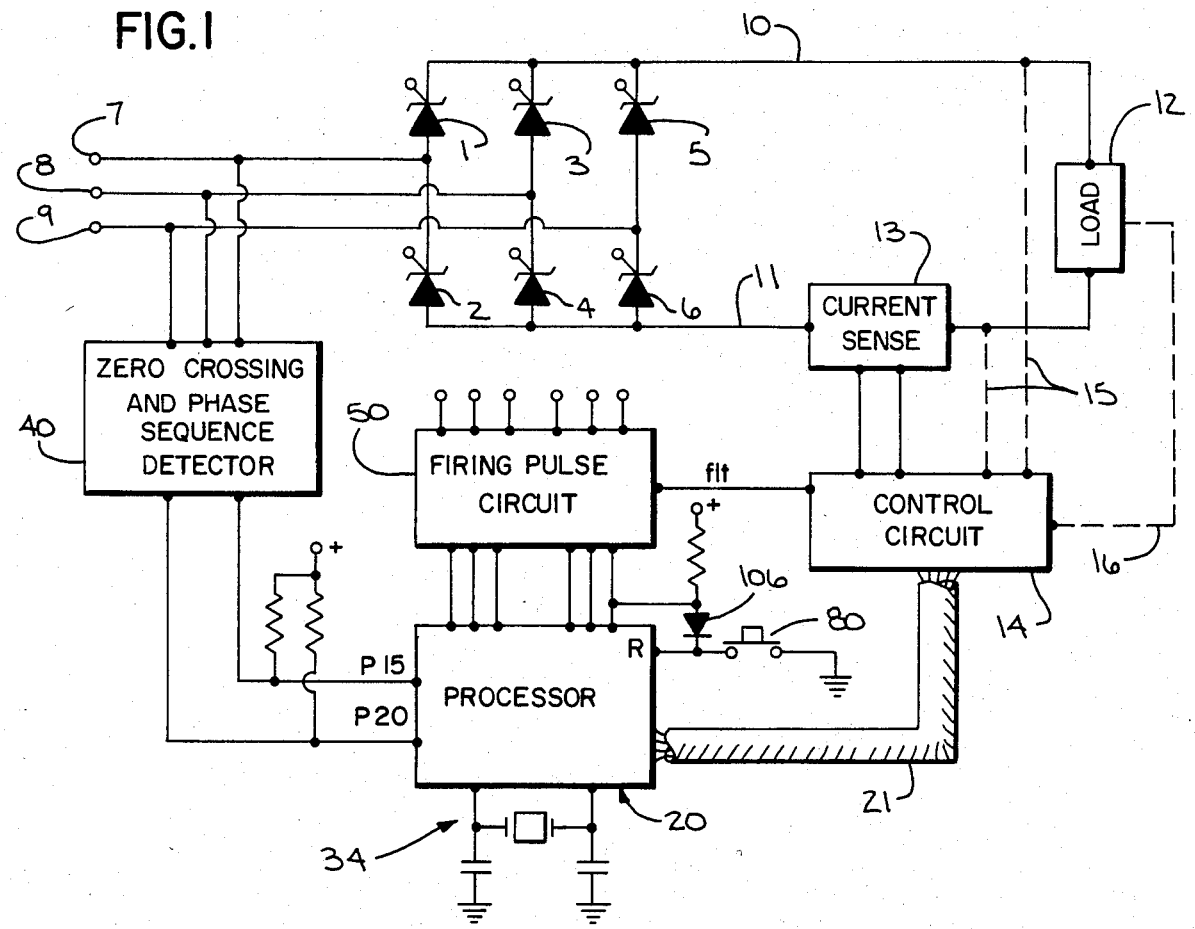
FIG. 1 is an electrical block diagram of a static converter which employs the converter control of the present invention.

Referring particularly to FIG. 1, a static converter includes six thyristors 1-6 connected in a three-phase bridge to a source of three-phase a.c. electrical power received through lines 7-9. The thyristor bridge drives a d.c. bus comprised of power lines 10 and 11 which connect to a load 12. The load 12 may be any of a number of devices. In some applications a current sensor 13 may be connected to the d.c. bus to provide current feedback signals to a control circuit 14, while in other applications the voltage across the d.c. power lines 10 and 11 may be fed back, as indicated by dashed lines 15. The current sensor 13 may take the form of a resistor, a current transformer, or a Hall effect device.

In still other applications feedback signals may be generated by the load 12, as indicated by dashed line 16. Such feedback signals may indicate, for example, the speed of a motor, air gap flux density in a motor, motor torque, or load temperature. The control circuit 14 is designed to receive these feedback signals and generate command signals in accordance with a selected control algorithm, or strategy. Such control circuits may be very simple in structure, or they may be complex circuits such as those employed in adjustable speed induction motor drives. Regardless of the type of control circuit 14 used, one of the commands which it issues is a firing angle command which indicates the phase at which the thyristors 1-6 are to be triggered to accomplish the desired control functions. The present invention relates to the converter control circuitry which receives this firing angle command and triggers the thyristors 1-6 in the proper order and at the proper phase.

Figure 5:
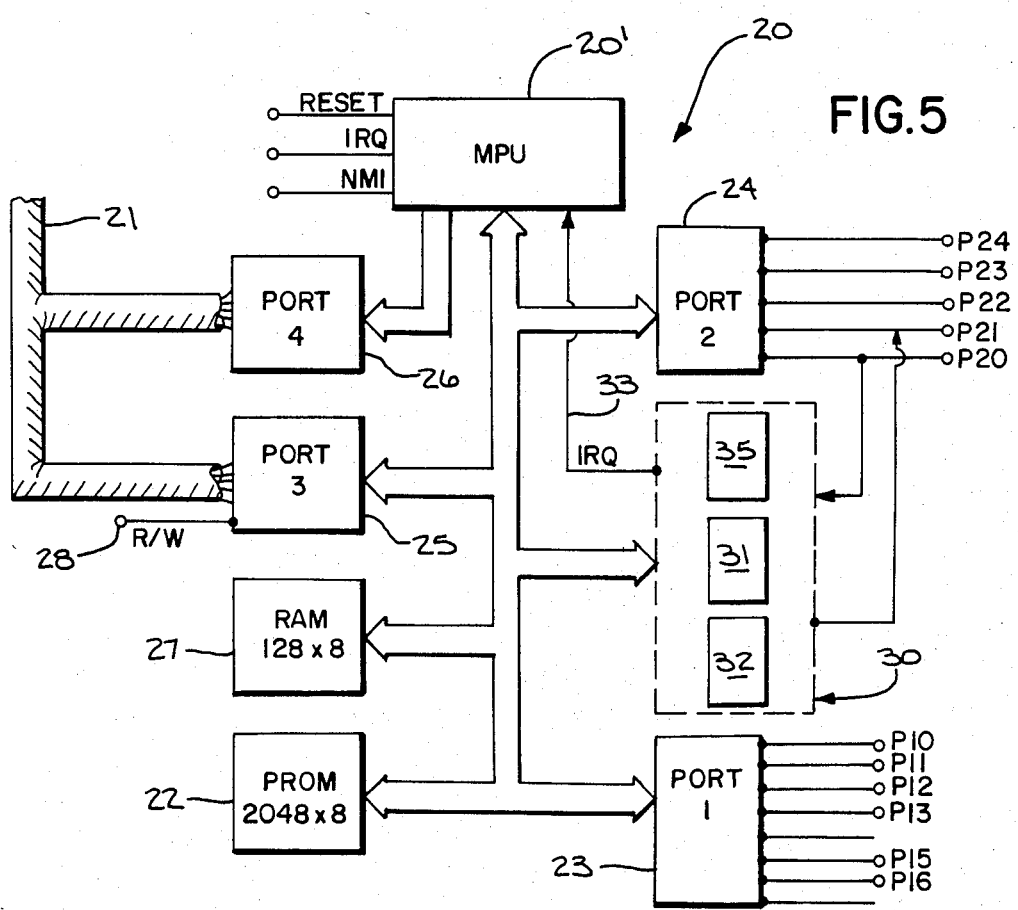
FIG. 5 is an electrical block diagram of the processor which forms part of the system of FIG. 1.

Referring particularly to FIGS. 1 and 5, the firing angle command is in the form of an 8-bit binary number which is applied to a processor 20 through a bus 21. The processor 20 is a single integrated circuit, MC 6801 manufactured by Motorola, Inc. which is a programmed microcomputer unit. As shown in FIG. 5, this processor 20 includes a read-only memory (PROM) 22 which stores a set of program instructions that are read out and executed by an MPU 20'. The processor 20 also includes a random access memory (RAM) 27 which stores a number of data structures, and it includes four 8-bit I/O ports 23-26 which interface the MPU 20' with the external circuitry.

During initialization, the I/O ports 23-26 are configured to perform specific functions. The 8-bit port 26 is employed to output address data through the bus 21 to the control circuit 14, and the port 25 is configured to input 8-bit firing angle commands from the control circuit 14. Port 25 also drives a read/write (R/W) control line 28 which is employed by the control circuit 14. The individual leads in ports 23 and 24 are configured for specific purposes which will become apparent from the description below.

A unique feature of the processor 20 is a 16-bit, three-function programmable timer indicated generally by dashed line 30. The timer 30 includes a free running, sixteen-bit counter 31 which is cleared during reset and which may be read at any time by the MPU 20'. The counter 31 is incremented by the same clock which drives the processor 20. The timer 30 also includes an output compare register 32 which is preset to a 16-bit value by the MPU 20' and which generates a logic signal at output P21 of port 24 when the free running counter 31 reaches the same value. When such a match is detected, a thyristor pair fires and the MPU 20' is interrupted through an IRQ control line 33. And finally, the timer 30 includes a 16-bit input capture register 35 which is employed to store the value in the free-running counter 31 when a preset logic state transition occurs at input lead P20 of I/O port 24. As will be explained in more detail below, the programmable timer 30 is employed as a means for advancing the firing sequence of the thyristors 1-6 at the proper moment during each cycle of the a.c. input power.

Figure 3:
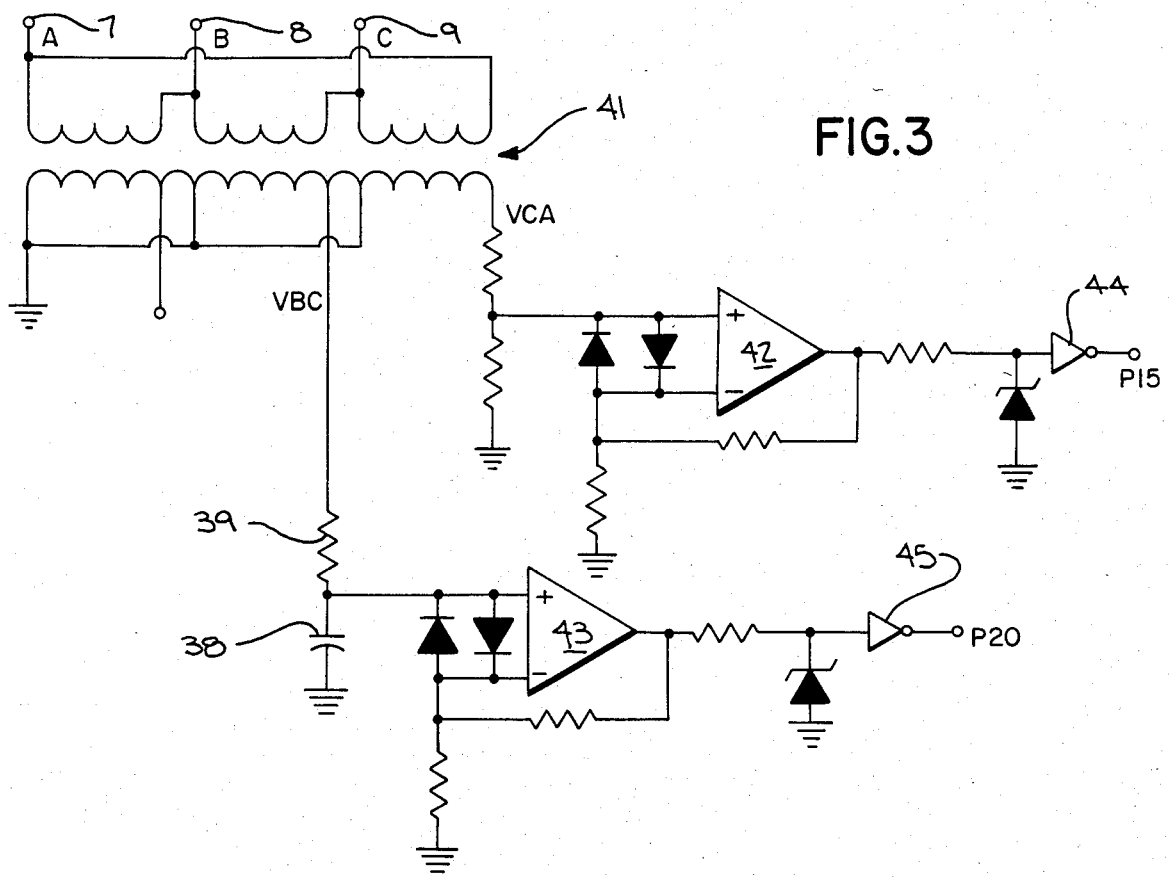
FIG. 3 is an electrical schematic diagram of the zero-crossing and phase sequence detector which forms part of the system of FIG. 1.

Referring particularly to FIGS. 1 and 3, a zero-crossing and phase sequence detector 40 provides signals to the processor 20 which indicate the actual phase of the a.c. input power and the phase sequence of the three powerline phases A, B and C. The detector 40 includes a delta-Y transformer 41 which has its primary windings connected to the power lines 7-9 and its secondary windings connected to produce line to line voltages VAB, VBC and VCA. The line to line voltage (VBC) lags the neutral voltage (VA) by 90 degrees and a filter formed by capacitor 38 and resistor 39 performs a 90 degree phase shift on VBC so that it is 180 degrees out of phase with VA. An amplifier 43 converts this phase-shifted voltage (VBC) to a TTL compatible signal which is applied to an inverter gate 45. The resulting logic level signal produced by inverter gate 45 is in phase with the neutral voltage (VA) and it serves as a synchronization signal which clocks the input capture register 35 in the processor 20.

The logic signal produced by a second amplifier 42 is employed during power-up to determine the phase sequence (ABC or ACB) of the input power. The amplifier 42 produces a TTL compatible signal which is in phase with the power line voltage VCA. This signal is inverted by a gate 44 to provide a logic signal which lags the output of inverter gate 45 by 30 degrees for a positive sequence (ABC), and which lags the output of inverter gate 45 by 150 degrees for a negative sequence (ACB).

Figure 2:
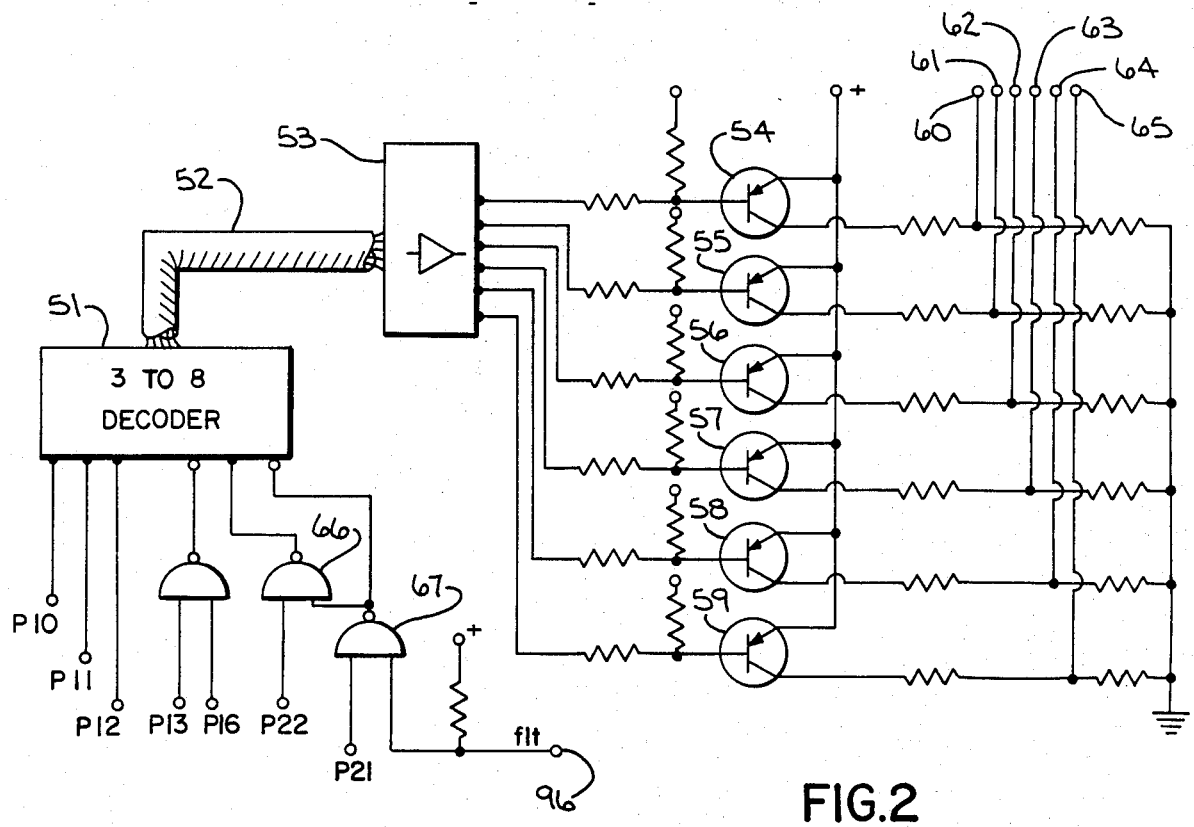
FIG. 2 is an electrical schematic diagram of the firing pulse circuit which forms part of the system of FIG. 1.

Referring particularly to FIGS. 1 and 2, the processor 20 outputs a 3-bit firing code to a firing pulse circuit 50. When a firing signal is subsequently output by the processor 20, one of the thyristor pairs is triggered into conduction. The 3-bit firing code is output through leads P10, P11 and P12 of port 23 to the select terminals on a 3-to-8 decoder circuit 51. Six outputs on the decoder 51 connect through a bus 52 and a set of six gates 53 to the bases of respective transistors 54-59. Each transistor 54-59 fires a pair of thyristors through pulse transformers (not shown) which connect to respective leads 60–65. Table A indicates the pattern in which the thyristors are fired for the two possible phase sequences.

TABLE A

| Phase A, B, C | |
|---|---|
| transistor 54 | thyristors 6 and 1 |
| transistor 55 | thyristors 1 and 2 |
| transistor 56 | thyristors 2 and 3 |
| transistor 57 | thyristors 3 and 4 |
| transistor 58 | thyristors 4 and 5 |
| transistor 59 | thyristors 5 and 6 |
| Phase A, C, B | |
| transistors 59 | thyristors 5 and 6 |
| transistors 58 | thyristors 4 and 5 |
| transistors 57 | thyristors 3 and 4 |
| transistors 56 | thyristors 2 and 3 |
| transistors 55 | thyristors 1 and 2 |
| transistors 54 | thyristors 6 and 1 |

The 3-to-8 decoder 51 is enabled by a NAND gate 67 when the output compare register 32 (FIG. 5) in the processor 20 detects equality with its free-running counter 31 and produces a firing signal at output lead P21. Output lead P13 is employed to disable the decoder 51 when firing pulses are not to be generated, and output lead P22 drives a second NAND gate 66 which toggles the decoder output to thereby apply a plurality of firing pulses to the selected thyristor pair. Such a string of firing pulses insures proper triggering.

A fault line (flt) connects to the NAND gate 67 and to the control circuit 14. The fault line (flt) provides a separate means for inhibiting the firing pulses in the event that a malfunction occurs in the processor 20. If this separate control is not required, it should be apparent that an alternative embodiment of the present invention might drive the gates 53 directly with the processor outputs, thus eliminating further components from the pulse firing circuit 50.

Before discussing in more detail the operation of the static converter, the control circuit 14 employed in the preferred embodiment will be described. As indicated above, however, it is an objective of the present invention to provide a general purpose static converter which will operate in a wide variety of applications and with a corresponding wide variety of control circuits 14. Thus, the particular control circuit described herein is not to be considered limiting.

Figure 4:
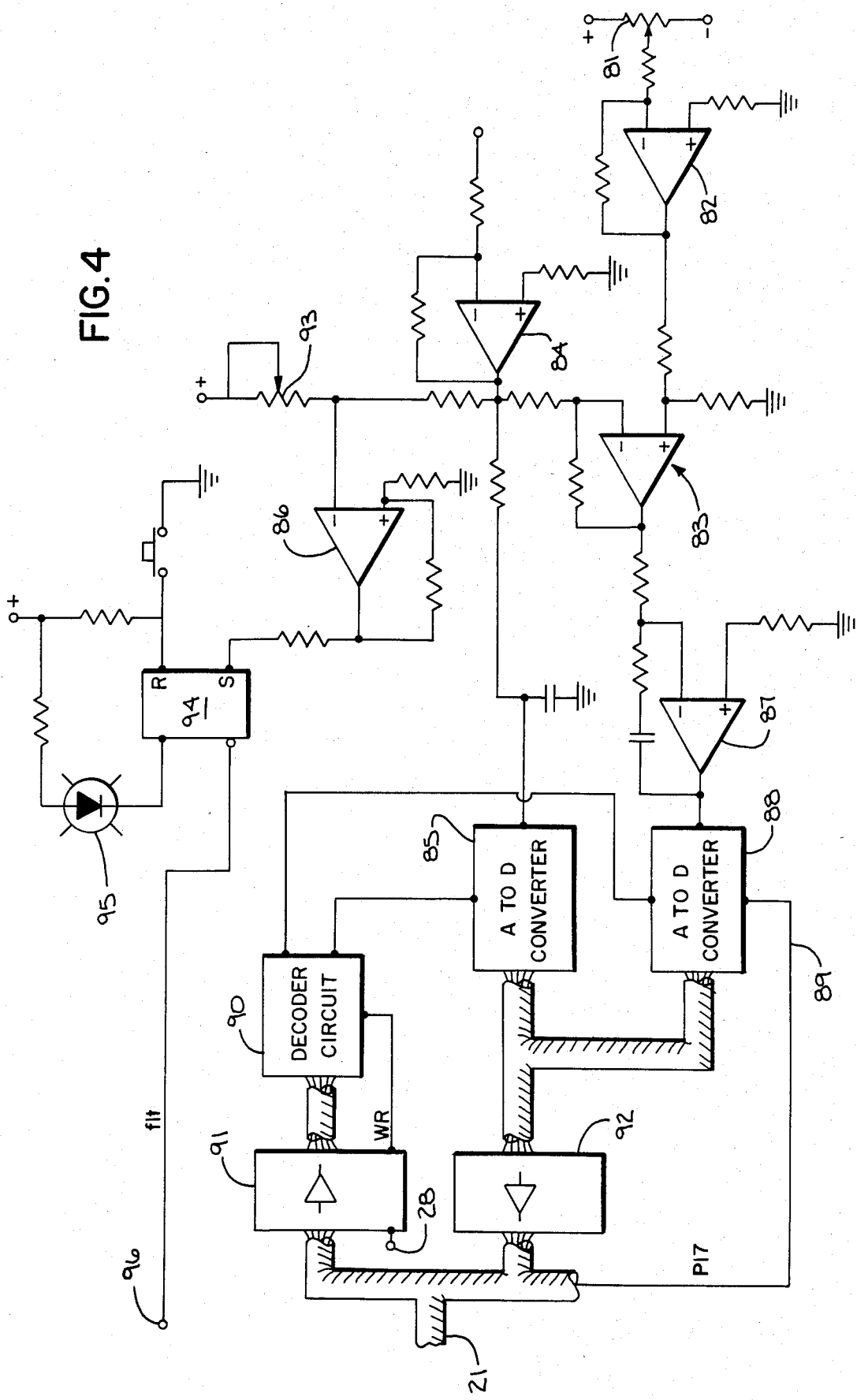
FIG. 4 is an electrical schematic diagram of a control circuit which may be employed in the system of FIG. 1.

Referring particularly to FIGS. 1 and 4, the control circuit 14 delivers phase commands to the processor 20 which control the current in the d.c. buses 10 and 11. The desired current level is established by the setting of a potentiometer 81 which connects to the input of an operational amplifier 82. The output of the amplifier 82 is a reference current which is applied to the non-inverting input of a comparator circuit 83.

The other input to the comparator 83 receives a current feedback signal produced by the current sensor 13. The current sensor 13 produces a signal which is applied to the inverting input of an operational amplifier 84, and the output of amplifier 84 is applied through resistors to the operational amplifier 83. The operational amplifier 83 produces a current command signal which is amplified by operational amplifier 87 and applied to the input of an analog-to-digital converter circuit 88.

The analog-to-digital converter 88 converts the current command signal to an 8-bit digital number which indicates the phase angle at which the thyristors are to be fired. When the conversion is completed, a "not busy" signal is generated on a line 89 to the P17 input terminal of the processor 20. The processor 20 reads this "firing angle command" number by applying a 3-bit address code to a decoder circuit 90 through gates 91. The signal thus generated by the decoder circuit 90 enables the converter 88 to output the firing angle command to a set of line driver gates 92 which connect to the bus 21.

The current feedback signal is also applied to an analog-to-digital converter 85 and is similarly changed to an 8-bit number which is indicative of the d.c. bus current. This current feedback number may be read into the processor 20 by addressing the converter 85 through the decoder circuit 90. The processor 20 may employ this current feedback number as a means for detecting an overcurrent condition.

Referring still to FIG. 4, the current feedback signal is also applied to a comparator 86. The output of the comparator 86 changes when the d.c. bus current exceeds an amount determined by the setting of a potentiometer 93. This change sets a flip-flop 94, which in turn energizes a light emitting diode 95 to indicate a current overload condition. The flip-flop 94 also generates a signal on the flt line 96 which is applied directly to the firing pulse circuit 50 (FIG. 2) to terminate the firing of the thyristors.

The control circuit 14 thus provides firing angle commands which change under varying load conditions, and it provides current overload signals for both the processor 20 and firing pulse circuit 50 when a current overload condition occurs.

As indicated above, the processor 20 operates in response to programs stored in its read-only memory 22. These programs direct the input of data from the zero crossing circuit 40 and control circuit 14, and they direct the output of data to the firing pulse circuit 50. The functions performed in response to the execution of these programs will now be described with reference to the flow charts in FIGS. 6A–6C.

Figure 6A:
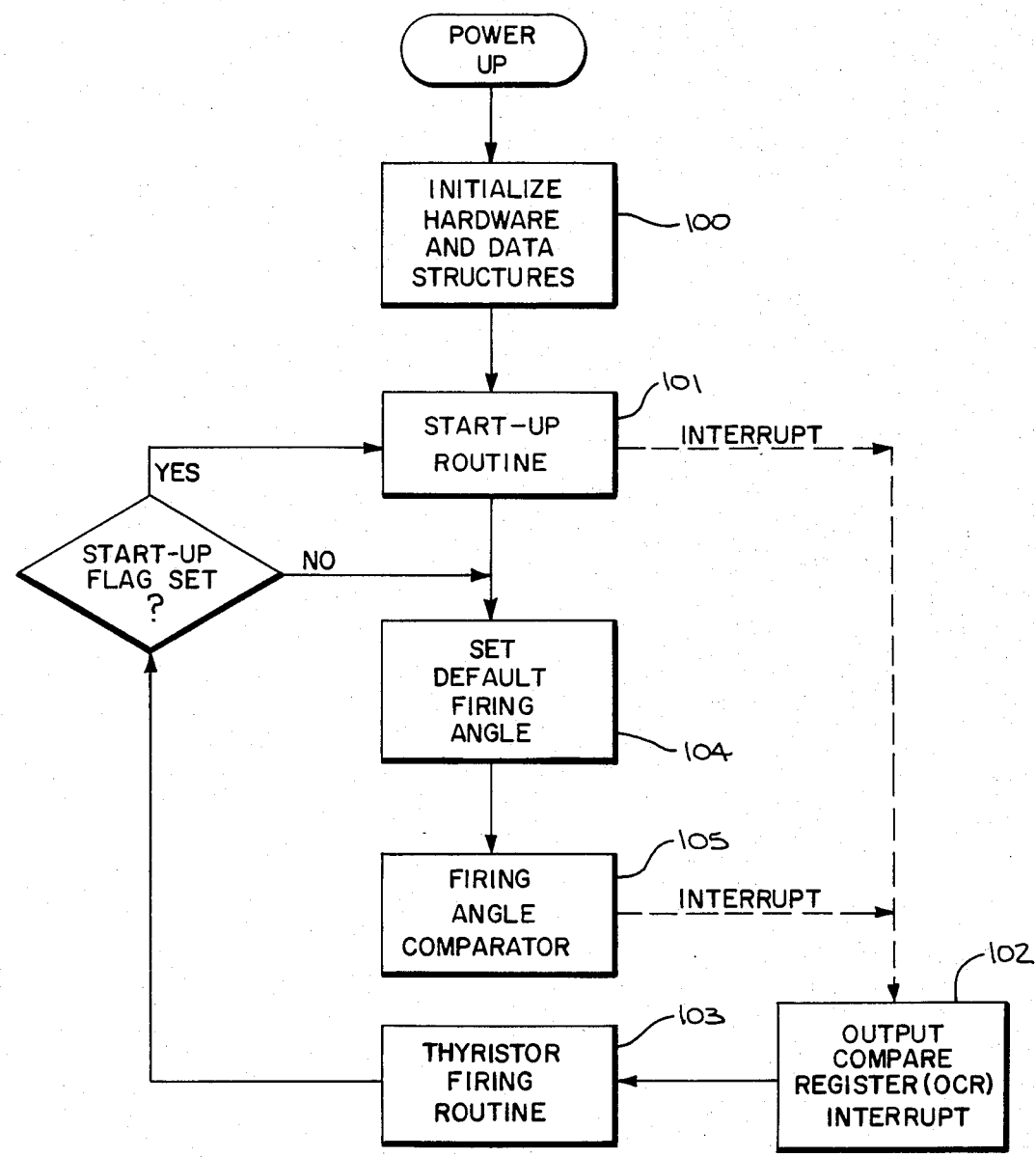

Referring particularly to FIGS. 5 and 6A, when the processor 20 is powered up it is vectored to a set of instructions indicated by process block 100 which is executed to initialize both the hardware and the data structures stored in the RAM 27. First the program must calculate the number of counts in the free running counter 31 for one cycle of the power line frequency. This is accomplished by calculating the change in the counter 31 between two zero crossings indicated at input terminal P20. This is repeated until two successive calculations are within 100 counts of each other and then the result is stored in RAM 27 as the variable "CP". A set of variables related to CP are then calculated and stored in the RAM 27 as indicated in Table B.

The phase sequence of the line voltages VA, VB and VC is then determined. If the phase sequence is positive, the signals on input terminals P20 and P15 should be 30 degrees out of phase, whereas a negative phase sequence results in a 150 degree phase difference. This is detected by monitoring the logic state of input P15 for a 180 degree period after a zero crossing is detected at input P20. Input P15 will be at a logic "1" for more than half of this period when the line voltages have a positive sequence and less than half of this period when the line voltages have a negative sequence.

TABLE B

| Variable | | |
|---|---|---|
| CP | 360° | of line voltage |

TABLE B-continued

| Variable | | |
|---|---|---|
| CP6 | 60° | of line voltage |
| CBMIN | 30° | of line voltage |
| CBMTOL | 2.8° | of line voltage |
| CBMAX | 175° | of line voltage |
| SYCTOL | 15° | of line voltage |
| CBCHNG | 11.25° | of line voltage |
| PULSEW | 1.875° | of line voltage |

Referring still to FIGS. 5 and 6A, after initialization a set of instructions indicated by process block 101 is executed to begin firing the thyristors. To prevent drawing excessive current during start-up, the commanded thyristor firing angle is ignored and the thyristor firing angle (ALPHA) is set to 90°. As will be explained in detail below, when the line voltage reaches this firing angle a thyristor pair is fired, an output compare register interrupt (OCR) occurs and the processor 20 is vectored by an interrupt service routine 102 to a thyristor service routine 103. The thyristor service routine 103 prepares for the next firing and the system then loops back to the start-up routine 101. The firing angle ALPHA is then decremented 11.25 degrees and the cycle repeats. The system continues to loop in this fashion through the start-up routine 101 until the firing angle ALPHA is less than the firing angle commanded by the control circuit 14 (FIG. 1). At that point a start-up flag (FLSTRT) is reset, and for all subsequent cycles of the line voltage, the firing angle is determined by the firing angle command.

The firing angle command (P1DATA) is periodically input from the control circuit 14 through the port 25. As indicated by process block 104, however, the firing angle ALPHA is first set to a default angle (CBMAX) to insure that the thyristors are fired in sequence at least once during each cycle of the power line voltage. A firing angle comparator routine 105 is then executed to input the firing angle command (PIDATA) and to calculate a count which is written to the output compare register (OCR) 32. This count indicates the point at which the next thyristor pair in the six step sequence is to be fired. As will be explained in more detail below, the system then loops within the comparator routine 105 until the count in the free running counter 31 (which corresponds to the phase of the power line voltages) is equal to the count in the output compare register 32. At this point a logic low voltage is generated at processor output terminal P21 to fire a thyristor pair, an OCR interrupt is produced, and the system is vectored by the service routine 102 to the thyristor service routine 103 to prepare for the next firing. As will be explained in more detail below, the thyristor service routine 103 checks the input capture register 35 to determine if the free running counter 31 is in synchronism with the power line voltages, and appropriate changes to the variables in TABLE B are made when differences are found. An index (SCRON) is also updated to indicate the next thyristor pair to be fired.

It should be apparent from the above general description that the elements of the programmable timer 30 are used to great advantage. The free-running counter 31 serves as a means for providing a convenient digital representation of the phase of the power line voltages, and the input capture register 35 operates in combination with the zero crossing circuit 40 as a means for periodically synchronizing the free running counter 31 with the line voltages. In addition, the output compare register 32 serves as a means for continuously comparing a digital representation of a firing angle with the angle, or phase, indicated by the free running counter 31, and initiating at once a firing pulse. All of these functions are accomplished with minimal burden on the D processor's MPU 20', thus enabling a number of other programmed functions to be carried out without significantly degrading system response time.

Referring particularly to FIG. 6B, the firing angle comparator routine 105 is shown in more detail. As indicated at process block 120, when the routine 105 is entered the interrupts are immediately enabled, and as a result, the OCR interrupt may occur before further processing takes place. Indeed, the firing angle comparator 105 is normally terminated by an OCR interrupt at some point during its execution.

As indicated at decision block 121, the logic state of processor flag (LIN) is tested to determine if the firing angle command received from the control circuit 14 is to be linearized. This flag is set during initialization by a single-bit input at P14, and this feature enables the converter control circuit to be "programmed" by the user for either a linear or nonlinear response to the firing angle command. If a nonlinear response is selected, the system loops at decision block 122 waiting for the digital-to-analog converter 88 in the control circuit 14 (FIG. 4) to complete a conversion. The firing angle command is then read from the A/D converter 88, as indicated at process block 123, and the 8-bit binary number (1-256) is converted, or scaled, to a corresponding number of free-running counter counts at process block 124. For example, if the firing angle command is "64" (one-fourth of 256), it corresponds to a firing angle command of 45 degrees. This is converted to a corresponding number of free-running counter counts, or in other words, one fourth of "CP"/2. The zero crossing count (CZERO) is then added, as indicated at process block 125, to synchronize the firing angle command count with the line frequency. The firing angle command count is then written to the output compare register (OCR) where it is continuously compared with the present value of the free-running counter 31. As indicated at decision block 126, if the firing angle limits are reached, the program exits to the thyristor service routine 103 after firing the thyristors as indicated at 128. Normally however, the comparator loop is exited via an OCR interrupt while the program is executing other instructions in the comparator loop.

With one exception, the linearization branch of the firing angle comparator routine 105 is the same as the nonlinear branch, and the identical blocks are marked with the same reference number followed by the suffix "a". The only difference is indicated at process block 127 which is a set of instructions that employ the A/D firing angle command number as an index into a compensation table stored in the processor PROM 22 (FIG. 5). The indicated value read from the compensation table is processed in the same fashion as described above to produce a firing angle command count. This linearization of the firing angle command provides for a linear response to any changes in the current feedback signal. Such a response is desirable in certain applications, but it should be apparent that other response characteristics may be easily implemented by the judicious selection of compensation table values.

Figure 6C:
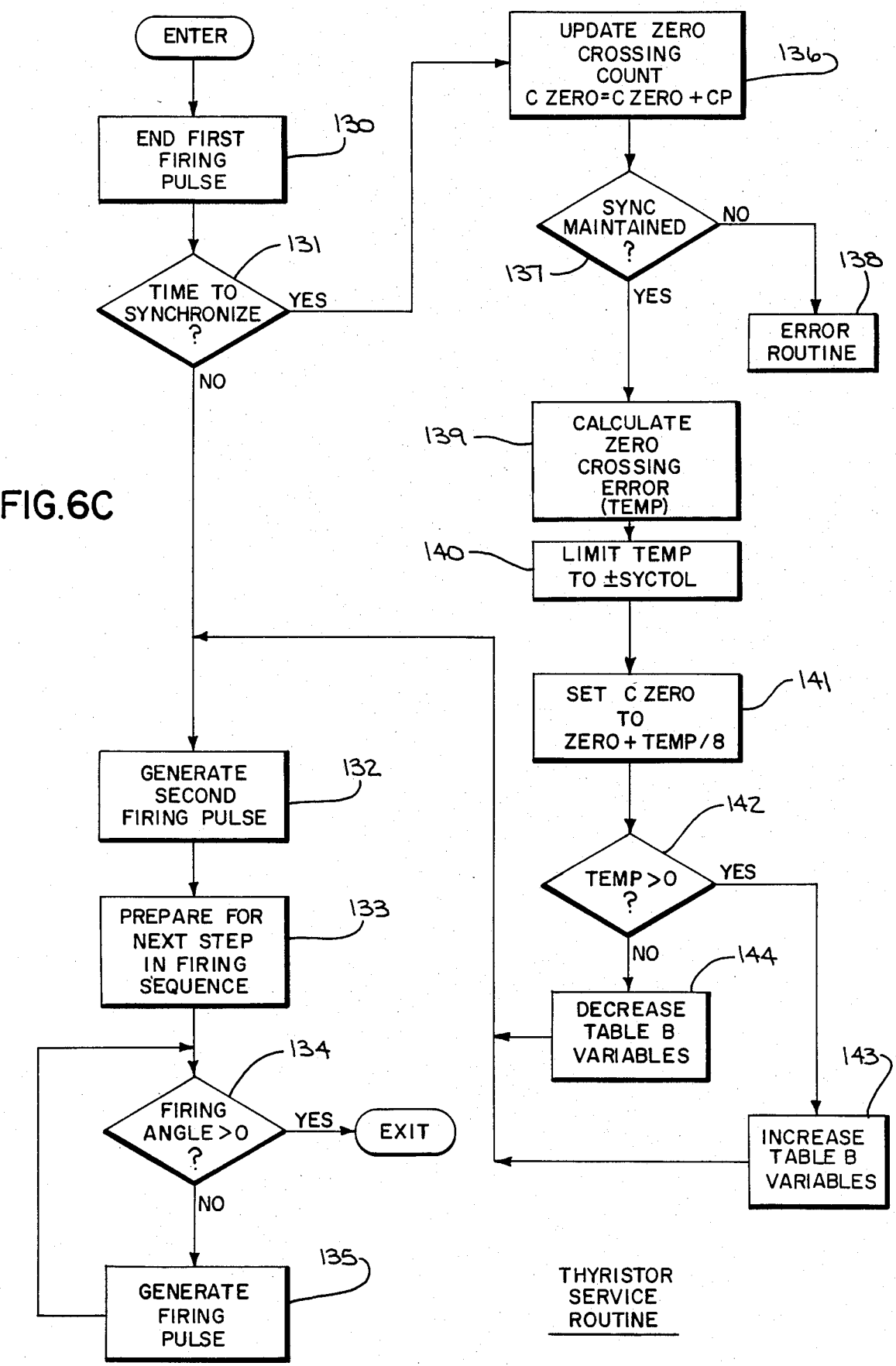

Referring particularly to FIGS. 1 and 6C, each time the thyristor service routine 103 is entered, a thyristor pair has been fired. As indicated by process block 130, this initial firing pulse is terminated after approximately 87 microseconds and then the index SCRON is checked at 131 to determine if the first thyristor pair in the firing sequence has just been fired. If so, the routine branches to execute instructions which resynchronize the system with the power line voltages. Otherwise, a second firing pulse is output to the firing pulse circuit 50, as indicated at process block 132, and the index SCRON is incremented (or decremented depending on phase sequence) at process block 133 in preparation for the next firing. The firing code for the next thyristor pair in the sequence is also output to the decoder 51 in the firing circuit 50 in preparation for the next OCR interrupt sequence. As indicated by decision block 134 and process block 135, the system then remains in a loop which outputs additional firing pulses to the firing pulse circuit 50 if the firing angle is less than zero. The sequence of firing pulses produced by the thyristor service routine 103 insures that the selected thyristor pair is gated on if the first pulse fails to accomplish this.

Referring still to FIG. 6C, once during each cycle through the firing sequence the free running counters are effectively resynchronized with the line voltages. This resynchronization is necessary due to changes in the power line frequency which affect the time interval between power line voltage zero crossings. The value of the free running counter at each such zero crossing is automatically latched in the input capture register (ICR) 35, and this count is compared with the reference count (CZERO) to determine if the free running counter is synchronized. As indicated at process block 136, the reference count (CZERO) is added to the count (CP) which represents one complete power line cycle. If this sum agrees with the contents of the ICR register 35, the system is perfectly synchronized. As determined at decision block 137, if these values are significantly different for several power line cycles, synchronization has been lost and an error routine 138 is entered to shut the system down.

Typically, the synchronization is not perfectly maintained and a count (TEMP), which represents the difference between the actual zero crossing and the zero crossing "predicted" by CZERO+CP is calculated at process block 139. This error count TEMP is limited to a value under 15 degrees at process block 140 and it is then used to correct the reference count (CZERO), as indicated at process block 141. If the error (TEMP) is positive, as determined at decision block 142, the variables in Table B are increased at 143 by a fixed amount to reflect the fact that the power line frequency has decreased. Otherwise, the Table B values are decreased at process block 144 to reflect an increase in power line frequency.

The amount of the change made to the table values is small (plus or minus 1 counts to CP) during each cycle through the resynchronization process. By making relatively small changes during each cycle the system will not respond drastically to momentary changes in power line zero crossing. Such momentary changes are usually caused by power line noise, and thus the present system effectively filters out such aberrations by adjusting to the average zero crossing interval taken over a significant period of time. There are, of course, other methods for accomplishing a similar result. For example, a running average of the zero crossing intervals can be maintained and changes made according to this average value. After the system has been resynchronized, the remainder of the thyristor service routine 103 is executed as described above, and the cycle is continued.

I claim:

1. A control circuit for a static converter, the combination comprising:
   a firing pulse circuit for firing thyristors in response to a received firing code;
   a zero crossing detector for generating a signal which is synchronized with the line voltage applied to the thyristors;
   a free running counter which generates a binary count that is continuously changed;
   synchronizing means coupled to the zero crossing detector and the free running counter for periodically generating a reference count which indicates the binary count generated by the free running counter at a preselected phase of the line voltage;
   input means coupled to receive the reference count from the synchronizing means and summing it with a firing angle command to produce a firing count; and
   comparator means coupled to the input means and the free running counter for generating a firing code to the firing pulse ciruit when the binary count generated by the free running counter reaches a value which corresponds to the firing count.

2. The control circuit as recited in claim 1 in which a set of firing codes are stored and the comparator means reads these firing codes and applies them in sequence to the firing pulse circuit.

3. The control circuit as recited in claim 2 which includes means for establishing a count (CP) which indicates the change in the count of the free running counter during one cycle of the line voltage, in which there are n firing codes, and in which successive ones of the firing codes are applied to the firing pulse circuit each time the free running counter changes CP/n counts.

4. The control circuit as recited in claim 1 in which the synchronization means includes an input capture register which stores the value of the free running counter once during each cycle of the line voltage, and the count stored in the input capture register is employed to calculate the reference count, and the difference between successive counts stored in the input capture register is indicative of the number of free running counter counts in one cycle of the power line voltage.

5. The control circuit as recited in claim 1 which includes a look-up table which stores firing count values which correspond to firing angle commands, and the input means reads firing count values from the look-up table which correspond to received firing angle commands, wherein the values stored in the look-up table are selected to provide a desired response characteristic to firing angle commands.

* * * * *